(12) United States Patent
Borkholder

(10) Patent No.: US 10,639,950 B2
(45) Date of Patent: May 5, 2020

(54) TORSION TRAILER COUPLER

(71) Applicant: Carl J. Borkholder, Bremen, IN (US)

(72) Inventor: Carl J. Borkholder, Bremen, IN (US)

(73) Assignee: GEN-Y Creations, LLC, Nappanee, IN (US)

( * ) Notice: Subject to any disclaimer, the term of this patent is extended or adjusted under 35 U.S.C. 154(b) by 221 days.

(21) Appl. No.: 15/966,263

(22) Filed: Apr. 30, 2018

(65) Prior Publication Data

US 2019/0329614 A1 Oct. 31, 2019

(51) Int. Cl.
| | |
|---|---|
| *B60D 1/50* | (2006.01) |
| *B60D 1/52* | (2006.01) |
| *B60D 1/48* | (2006.01) |
| *B60D 1/24* | (2006.01) |
| *B60D 1/58* | (2006.01) |
| *B60D 1/167* | (2006.01) |
| *B60D 1/46* | (2006.01) |

(52) U.S. Cl.
CPC ............... *B60D 1/50* (2013.01); *B60D 1/248* (2013.01); *B60D 1/46* (2013.01); *B60D 1/52* (2013.01); *B60D 1/58* (2013.01)

(58) Field of Classification Search
CPC ........ B60D 1/167; B60D 1/247; B60D 1/248; B60D 1/42; B60D 1/46; B60D 1/50; B60D 1/52; B60D 1/58
See application file for complete search history.

(56) References Cited

U.S. PATENT DOCUMENTS

| | | | | |
|---|---|---|---|---|
| 2,847,232 A | * | 8/1958 | Graham ................... | B60D 1/46 280/490.1 |
| 4,641,852 A | * | 2/1987 | Kerst ....................... | B60D 1/50 280/489 |
| 4,792,154 A | * | 12/1988 | Kerst ....................... | B60D 1/50 280/489 |
| 5,934,698 A | * | 8/1999 | Despain ................... | B60D 1/46 280/490.1 |
| 6,454,019 B1 | * | 9/2002 | Prairie ................. | A01B 63/145 111/163 |
| 6,494,478 B1 | * | 12/2002 | MacKarvich ............ | B60D 1/06 177/136 |
| 7,219,915 B2 | * | 5/2007 | Christensen ............. | B60D 1/46 280/490.1 |
| 7,377,536 B2 | * | 5/2008 | Rehme ................... | B60D 1/065 280/483 |
| 9,193,233 B2 | * | 11/2015 | Schwarz .................. | B60D 1/42 |
| 9,505,281 B1 | * | 11/2016 | Borkholder ............ | B60D 1/248 |

(Continued)

*Primary Examiner* — Joseph M Rocca
*Assistant Examiner* — Maurice L Williams
(74) *Attorney, Agent, or Firm* — Botkin & Hall, LLP

(57) ABSTRACT

A torsion trailer coupler is affixed to a trailer between the tongue and an adjustable coupler. The torsion trailer coupler has a trailer side that affixes to the trailer and a coupler side that affixes to the adjustable coupler. The trailer side has torsion tubes that carry torsion bars and the coupler side has torsion tubes that carry torsion bars. The torsion bars between the trailer and coupler side are connected with torsion arms. The torsion trailer coupler moves between an unloaded position where the torsion bars and arms are at rest and a loaded position where force is applied between the sides and the torsion bars rotate about their central axes. The torsion bars, arms and sides cooperate to absorb transient forces between a towing vehicle and the tongue of the trailer.

20 Claims, 9 Drawing Sheets

(56) References Cited

U.S. PATENT DOCUMENTS

| | | | | |
|---|---|---|---|---|
| 9,868,327 | B1* | 1/2018 | Borkholder | B60D 1/485 |
| 10,106,002 | B2* | 10/2018 | McAllister | B60D 1/485 |
| 10,343,470 | B2* | 7/2019 | Borkholder | B60D 1/50 |
| 10,493,811 | B2* | 12/2019 | Borkholder | B60D 1/249 |
| 2003/0178811 | A1* | 9/2003 | Buckner | B60D 1/50 |
| | | | | 280/483 |
| 2010/0207360 | A1* | 8/2010 | Columbia | B60D 1/02 |
| | | | | 280/504 |
| 2015/0184795 | A1* | 7/2015 | Babuska | B60D 1/07 |
| | | | | 248/314 |
| 2017/0305217 | A1* | 10/2017 | Hatley | B60D 1/06 |
| 2019/0031255 | A1* | 1/2019 | Borkholder | B60D 1/143 |

* cited by examiner

TORSION TRAILER COUPLER

BACKGROUND OF THE INVENTION

This present disclosure relates to trailers, specifically the attachment between the trailer and a towing vehicle. Commonly, when being towed by a vehicle, the trailer is subject to transient forces as the towing vehicle pulls the trailer over various terrains or when loads are moved or placed on the trailer. Trailers have a tongue weight that is borne by the hitch ball attached to the towing vehicle, commonly at or near the rear bumper. While driving, transient forces on the trailer can translate to transient tongue forces transmitted to the towing vehicle, at the very least, can be unsettling to the driver. In an extreme situation, the transient tongue forces can create a dangerous loss of control. An improved adapter that can be affixed directly to the trailer and the towing vehicle is necessary.

SUMMARY OF THE INVENTION

The present disclosure describes a torsion adapter that is added to a trailer between the tongue of the trailer and an adjustable trailer coupler. The torsion adapter has a trailer mounted side and a coupler mounted side with torsion arms that connect the sides. The trailer side has an upper and lower torsion tube that each carries a corresponding torsion bar. The coupler side has an upper and lower torsion tube that each carries a corresponding torsion bar. The torsion bars have resilient cords that surround them and cause the torsion bar to resist rotation with respect to its torsion tube. The torsion arms are affixed to the terminal ends of the torsion bars to connect the sides. The trailer side and coupler side each have mounting apertures that are aligned with a plane. As force is applied between the trailer side and coupler side, the torsion adapter moves from an unloaded position to a loaded position.

BRIEF DESCRIPTION OF THE DRAWINGS

A preferred embodiment of this invention has been chosen wherein.

DESCRIPTION OF THE PREFERRED EMBODIMENT

Figure 1:
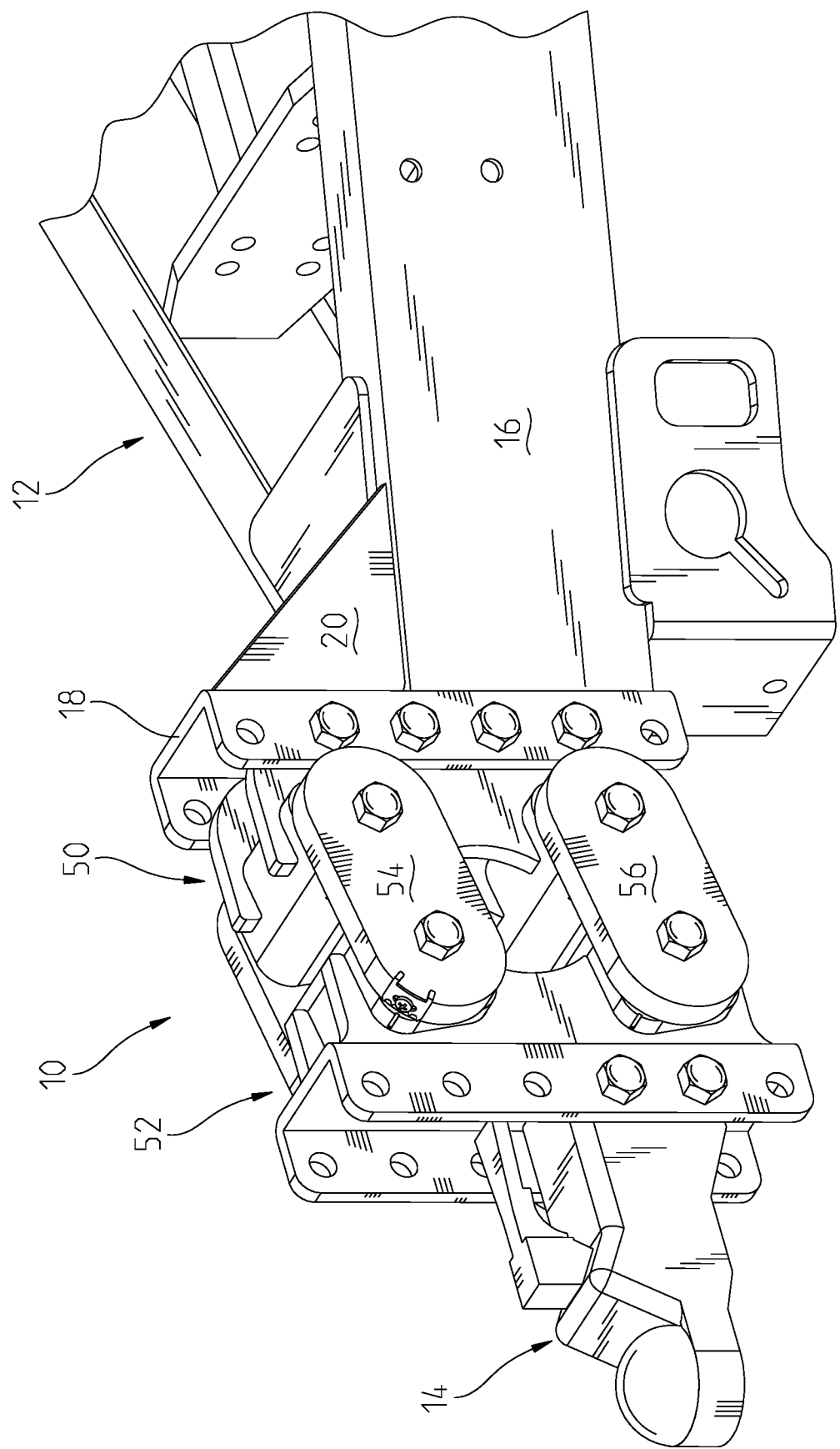
FIG. 1 is an isometric view of the torsion coupler affixed to a trailer.
Figure 2:
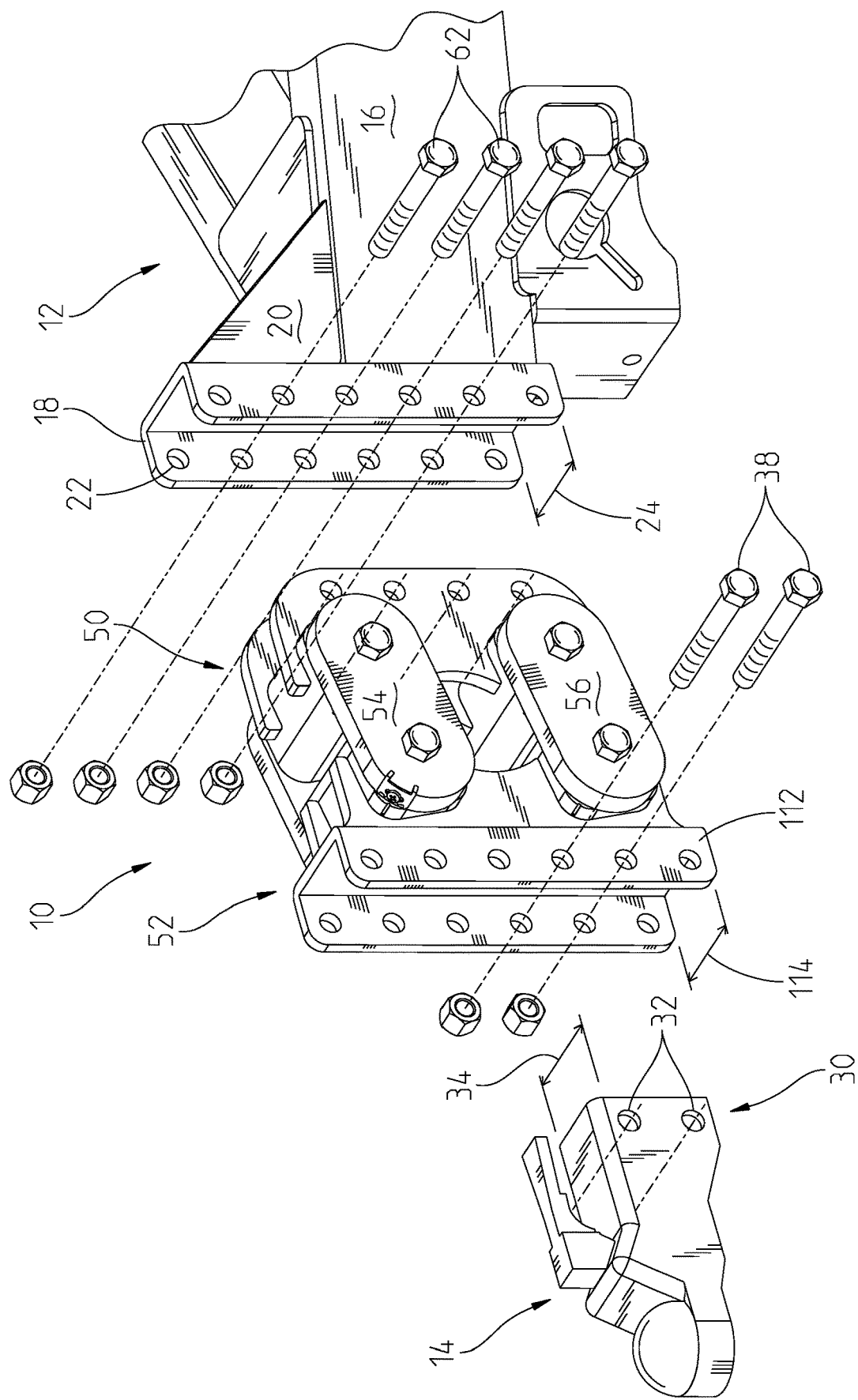
FIG. 2 is an isometric view of the torsion coupler and trailer before assembly to the trailer.
Figure 3:
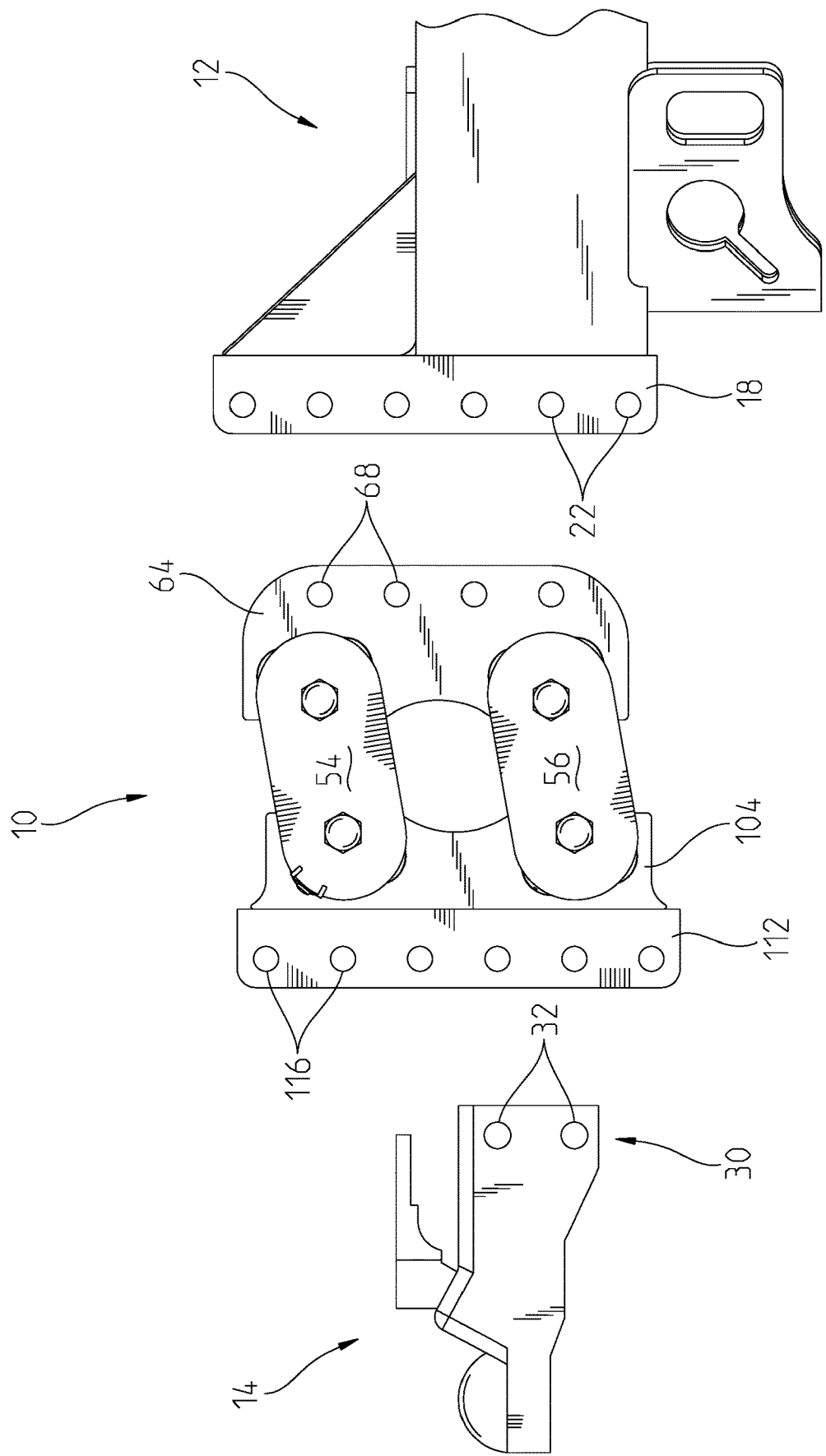
FIG. 3 is a left side view of the torsion coupler and trailer as shown in FIG. 2.
Figure 4:
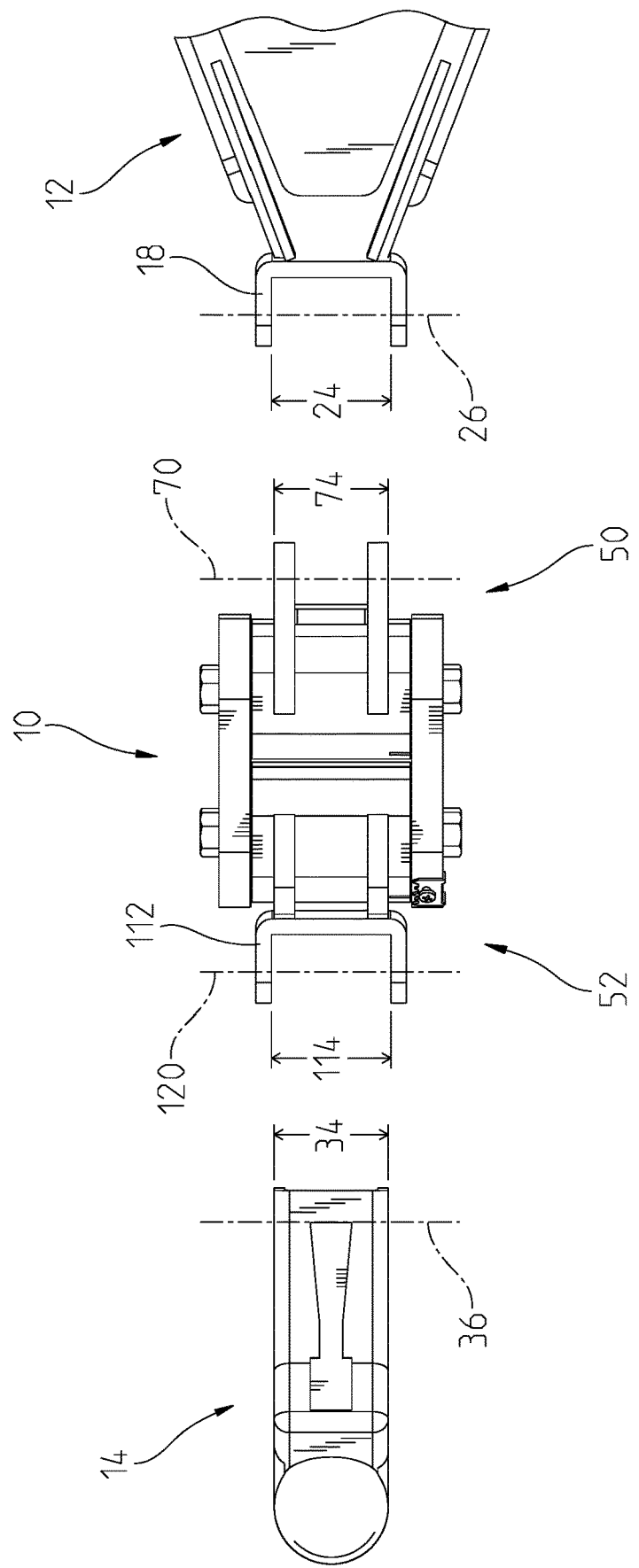
FIG. 4 is a top view of the torsion coupler and trailer as shown in FIG. 2.
Figure 5:
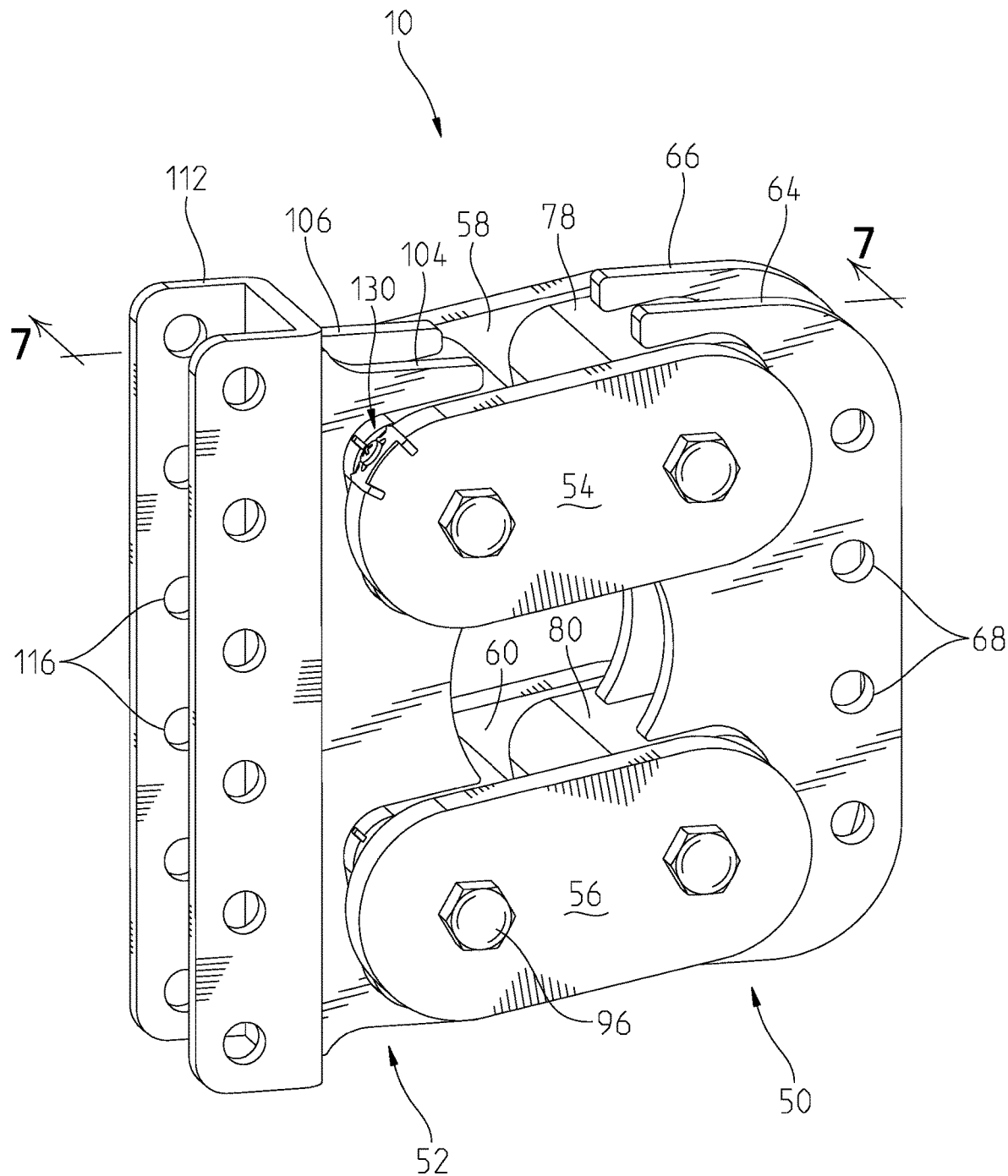
FIG. 5 is an isometric view of the torsion coupler.
Figure 6:
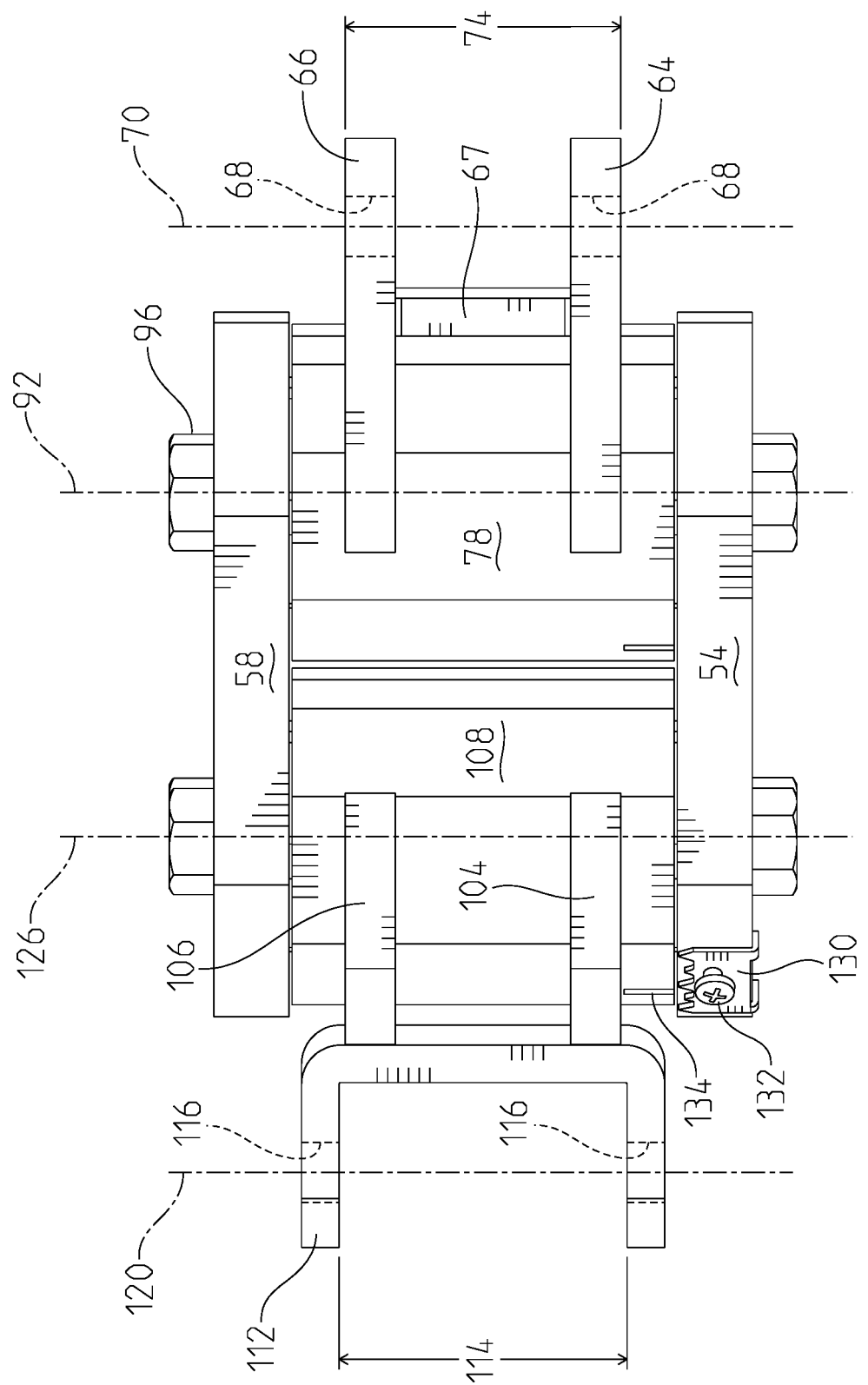
FIG. 6 is a top view of the torsion coupler.

An adjustable torsion coupler 10 is shown attached between an existing trailer 12 and an adjustable coupler 14 in FIGS. 1-4. The trailer 12 has a frame 16 with a fixed channel 18. The fixed channel 18 is rigidly affixed to the frame 16, commonly through welding or fasteners. The fixed channel 18 may be further supported by gussets 20 or other bracketry. The fixed channel 18 has a fixed channel width 24 and series of apertures 22 that are aligned with a fixed plane 26. The adjustable coupler 14 is well-known in the art and is designed to attach to a vehicle-mounted ball (not shown). The adjustable coupler 14 can be directly affixed to the trailer 12 through the fixed channel 18. The fixed channel 18 allows the adjustable coupler 14 to be affixed thereto in several different vertical positions. The adjustable coupler 14 has a mounting end 30 with a coupler width 34 and apertures 32 that align with a coupler plane 36. The adjustable coupler 14 is affixed to the torsion coupler 10 with fasteners 38.

The torsion coupler 10 has a trailer side 50 and a coupler side 52 with torsion arms 54, 56, 58, 60 connecting the two sides 50, 52. The trailer side 50 is designed to attach to the fixed channel 18 with fasteners 62, shown as bolts in FIG. 1. The trailer side 50 has identical parallel plates 64, 66 with apertures 68 that align with a tongue plane 70. The parallel plates 64, 66 are spaced apart from each other and affixed to torsion tubes 78, 80 to form a tongue portion 72 with a tongue width 74. The torsion tubes 78, 80 are a square shaped tube with rounded corners, as is typical and well-known in the art. The tongue width 74 is defined by the distance between the outer surfaces of the parallel plates 64, 66. A spacer wall 67 may be used to set the spacing and reinforce the parallel plates 64, 66. The parallel plates 64, 66 are commonly welded to the torsion tubes 78, 80, but other methods to affix them are contemplated. It is contemplated that a solid component is used that is attached to or integrated with the torsion tubes 78, 80. For example, the torsion tubes 78, 80 and tongue portion 72 could be a solid cast metal or machined component. The tongue width 74 allows the tongue portion 72 to be located in the fixed channel 18, shown in FIG. 1. The apertures 68 align with apertures 22 to allow the fasteners 62 to affix the trailer side 50 to the fixed channel 18 on the trailer 12.

Figure 7:
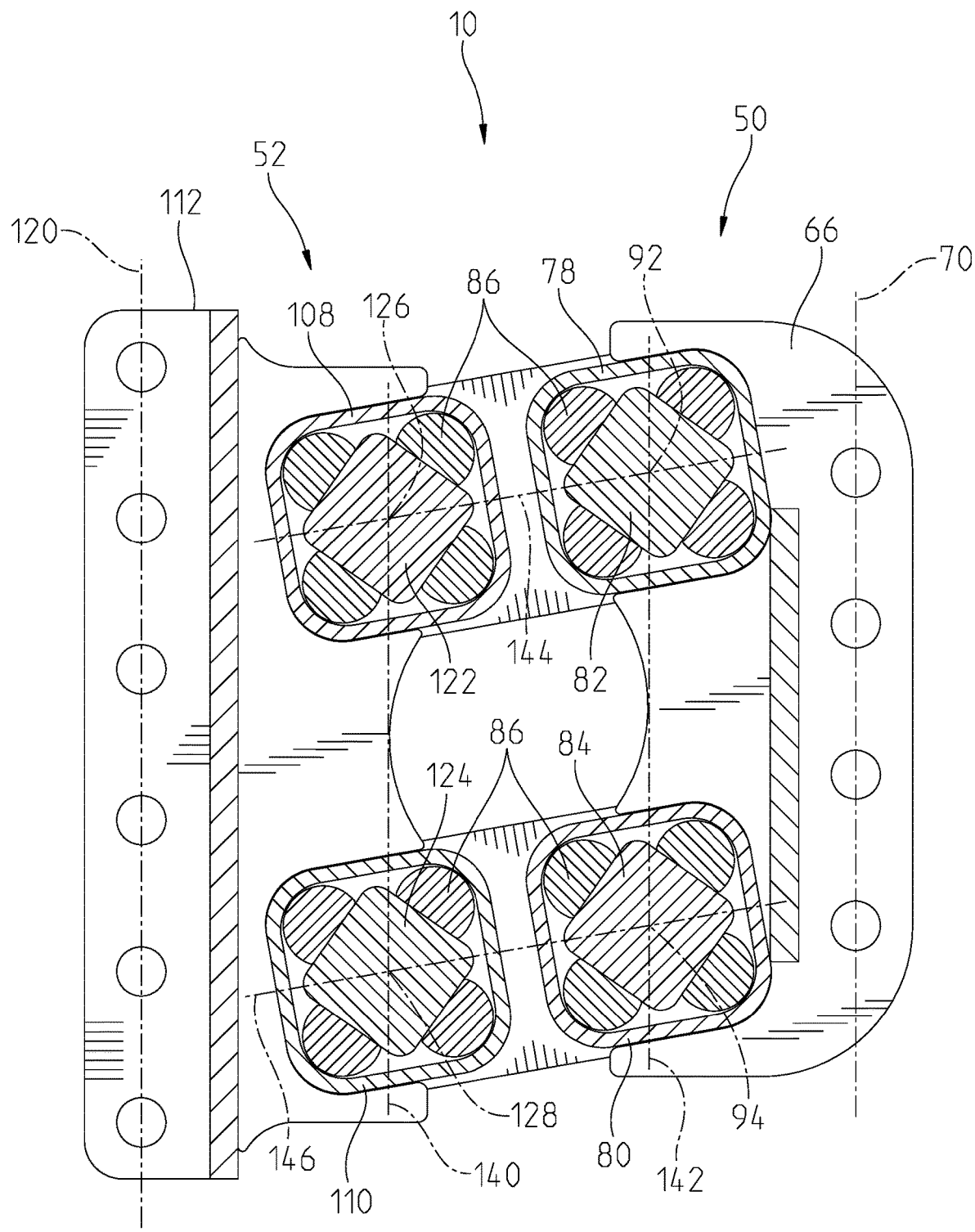
FIG. 7 is a section view 7-7 of the torsion coupler in FIG. 5.
Figure 8:
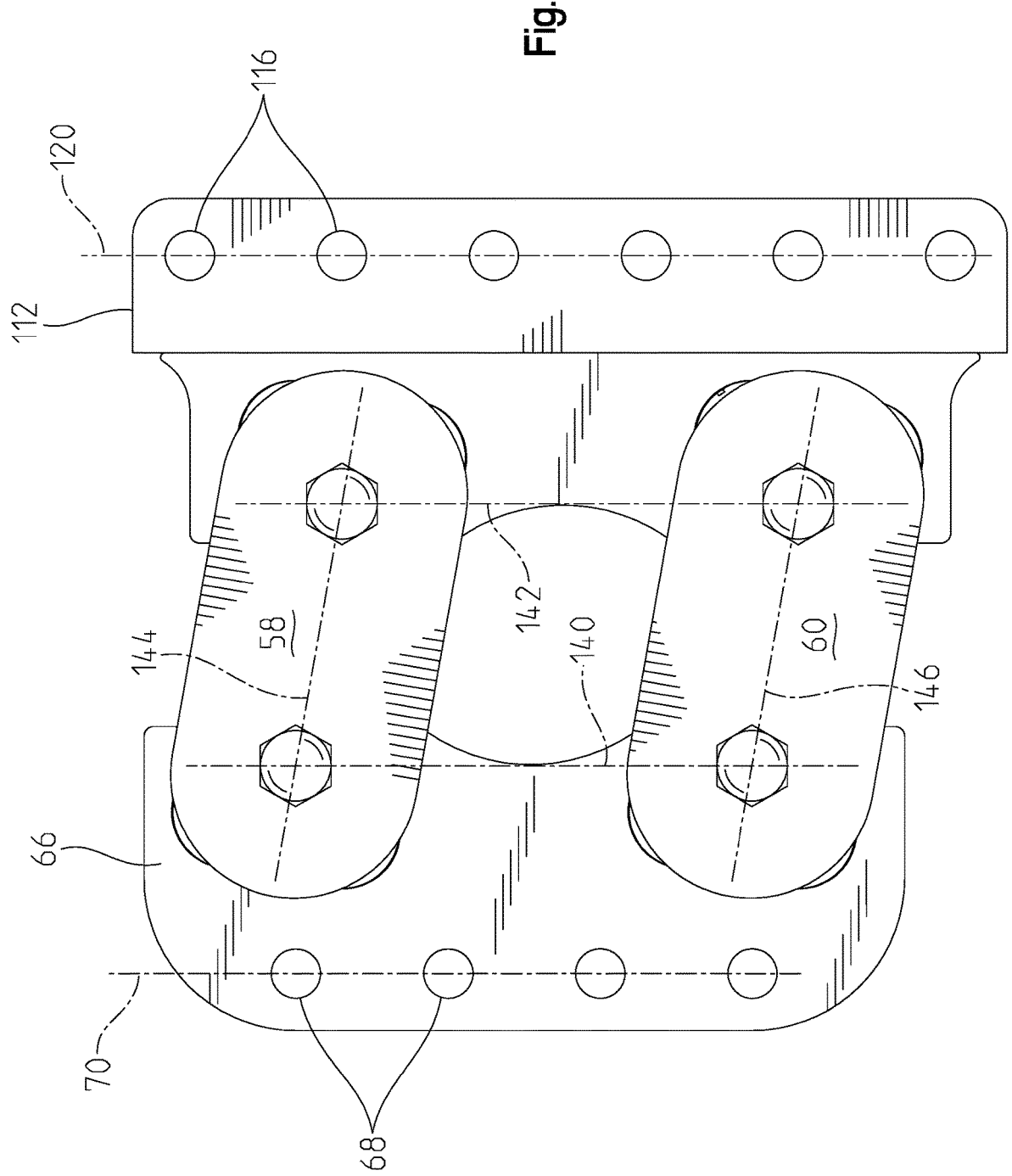
FIG. 8 is a right side view of the torsion coupler.
Figure 9:
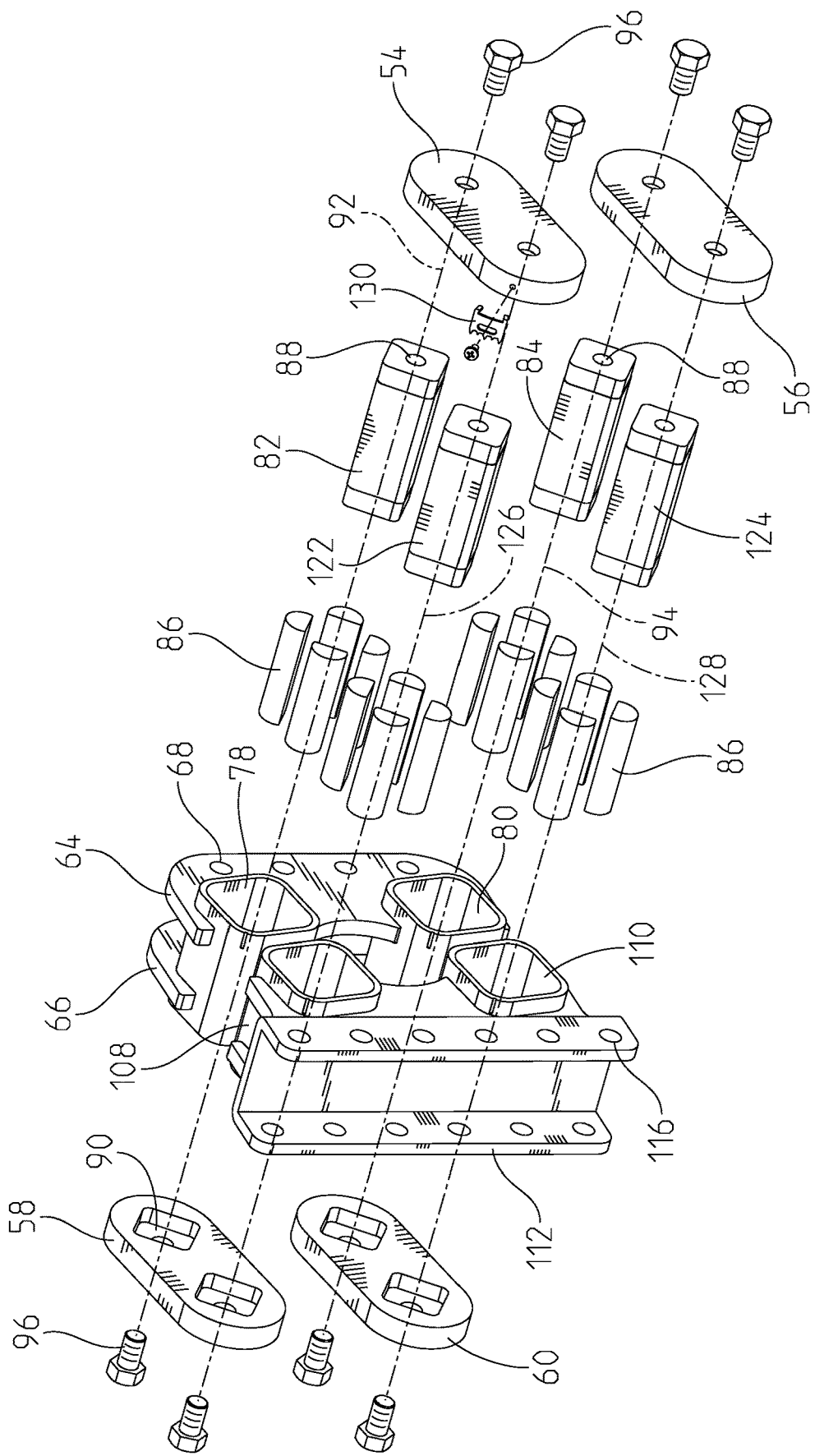
FIG. 9 is an exploded isometric view of the torsion coupler.

The torsion tubes 78, 80 carry a corresponding torsion bar 82, 84. The torsion tubes 78, 80 are obliquely angled with respect to the tongue plane 70, as is visible in FIG. 7. Terminal ends of the torsion bars 82,84 extend beyond the ends of their corresponding torsion tube 78,80. Resilient cords 86 surround the torsion bars 82, 84. The resilient cords 86 are shown in the exploded diagram of FIG. 9 and section view FIG. 7. The resilient cords 86 are located between flat surfaces on the torsion bars 82,84 and the rounded corners of the torsion tubes 78,80. When the torsion bars 82, 84 are located their respective torsion tubes 78, 80 and surrounded by the resilient cords 86, the torsion bars 82,84 resist rotation with respect to the torsion tubes 78,80. The torsion bars 82, 84 have a corresponding central axis 92, 94. As shown in FIG. 9, the torsion bars 82, 84 are longer than the corresponding tubes 78, 80 that they reside in, so as assembled, the ends stick out on either side. A fastener 96 extends through an aperture in the torsion arm 54,56,58,60 and affixes the torsion arm to the corresponding torsion bar 82,84 by threading into a threaded hole 88 in the end of its respective torsion bar 82,84. Torque and other forces between the torsion bars 82,84 and torsion arms 54,56,58,60 are carried by the bolts and the interfaces between the pockets and the ends of the torsion bars 82,84. As shown, the torsion bars 82, 84 are primarily square shaped in their cross section, but it is contemplated that other shapes are possible. The torsion arms 54, 56, 58, 60 have corresponding pockets 90 that receive the ends of the torsion bars 82,84. The square shape fits into the receiving pocket 90 that rotationally affixes the torsion bar 82, 84 to its corresponding torsion arm

54, 56, 58, 60. A fastener 96 holds the torsion arm 54,56, 58,60 to its corresponding torsion bar.

The coupler side 52 also has parallel plates 104, 106 that are affixed to torsion tubes 108, 110. As is visible in FIG. 7, the torsion tubes 108,110 are obliquely angled with respect to a channel plane 120. A coupler channel 112 is also affixed to the parallel plates 104, 106 and has a channel width 114. These components are commonly affixed through welding or other metal joining methods. The coupler channel 112 includes apertures 116 that align with the channel plane 120. It is contemplated that the coupler side 52 is a solid component that is attached to or integrated with the torsion tubes 108, 110. For example, the torsion tubes 108, 110 and coupler channel 112 could be a solid cast or machined component. The torsion tubes 108, 110 carry a corresponding torsion bar 122, 124. Terminal ends of the torsion bars 122,124 extend beyond the ends of their corresponding torsion tube 108,110. Resilient cords 86 surround the torsion bars 122, 124. When the torsion bars 122, 124 are located in their respective torsion tubes 108, 110 and surrounded by the resilient cords 86, the torsion bars 122,124 resist rotation with respect to the torsion tubes 108,110. The torsion bars 122, 124 have a corresponding central axis 126, 128. As shown in FIG. 9, the torsion bars 122, 124 are longer than the corresponding tubes 108, 110 that they reside in, so as assembled, the ends stick out on either side. A fastener 96 extends through an aperture in the torsion arm 54,56,58,60 and affixes the torsion arm to the corresponding torsion bar 122,124 by threading into a threaded hole 88 in the end of its respective torsion bar 122,124. Torque and other forces between the torsion bars and torsion arms are carried by the bolts and the interfaces between the pockets and the ends of the torsion bars. As shown, the torsion bars 122, 124 are primarily square shaped in their cross section, but it is contemplated that other shapes are possible. The torsion arms 54, 56, 58, 60 have corresponding pockets 90 that receive the ends of the torsion bars. The square shape fits into the receiving pocket 90 that rotationally couples the torsion bar 122, 124 to its corresponding torsion arm 54, 56, 58, 60. A fastener 96 holds the torsion arm 54,56,58,60 to its corresponding torsion bar 122,124.

An optional load indicator 130 is shown affixed to torsion arm 54 with a fastener 132. The adjacent torsion tube 108 has a reference line 134 that is compared to the indicator 130 to determine the amount of torque applied to the torsion arm 54 and torsion bar 122.

In use, the torsion coupler 10 is commonly subject to a downward force on the trailer side 50 (from the trailer tongue weight) and an upward force on the coupler side 52 (from the towing vehicle supporting the tongue weight). Without force acting between the coupler side 52 and trailer side, the torsion coupler 10 is in a resting position, shown in FIG. 3. In the resting position, the torsion arms 54, 56, 58, 60 are angled with respect to the tongue plane 70 and channel plane 120. As assembled to the trailer 12 and adjustable coupler 14, the tongue weight on the trailer 12, provides a downward force on the trailer side 50. When supported by the towing vehicle (not shown), the adjustable coupler 14 provides a reactive upward force that supports the tongue weight. As force that is generally parallel to planes 70, 120 is exerted between the coupler side 52 and trailer side 50, the torsion coupler 10 moves from the resting position toward a loaded position. The loaded position causes the torsion arms 54, 56, 58, 60 to become more flat and increased loads may cause the arms to angle upward. As force is applied, the force creates rotation in the torsion bars 82, 84, 122, 124 about their corresponding axes 92, 94, 126, 128. Because the torsion bars 82, 84, 122, 124 and torsion arms 54, 56, 58, 60 are coupled together, the coupler side 52 moves vertically with respect to the trailer side 50 and remains parallel throughout that movement. In particular, the tongue plane 70 remains parallel to the channel plane 120. Axis 140 intersects axes 126 and 128 and remains fixed with respect to the channel plane 120. Axis 142 intersects axes 92 and 94 and remains fixed with respect to the tongue plane 70. An upper arm axis 144 intersects axes 92, 142, 126 and 140. A lower arm axis 146 intersects axes 94, 142, 128, and 140.

To install the torsion coupler 10 on an existing trailer, the coupler 14 (if any) is removed from the fixed channel 18 by removing the fasteners 62 from the fixed channel 18. The tongue portion 72 is placed into the fixed channel 18 and the apertures 22, 68 are aligned. Depending on the length of the fixed channel 18 and number of apertures 22, the user may have the flexibility to locate the tongue portion 72 at different vertical positions. Fasteners 62 are installed and tightened down. The user selects the desired height of the adjustable coupler 14 by aligning apertures 32 with apertures 116 in the coupler channel. Fasteners 38 are tightened down to affix the adjustable coupler 14 to the torsion coupler 10. The user then couples the adjustable coupler 14 to the towing vehicle (not shown). As installed, the torsion coupler 10 is attached with the coupler channel 112 parallel to the fixed channel 18 of the trailer. As load is applied, the torsion bars and torsion arms rotate, and the coupler channel 112 remains parallel to the fixed channel 18 of the trailer.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A torsion trailer coupler adapted to be affixed between a trailer frame and an adjustable coupler, said trailer frame having a fixed channel affixed thereto and having a fixed channel width, said fixed channel having a plurality of apertures extending therethrough, said torsion trailer coupler comprising:

a trailer side having a tongue portion with a tongue width adapted to be received by and affixed to said fixed channel, said tongue portion having a plurality of apertures extending therethrough and aligned with a tongue plane, said trailer side having a first torsion tube affixed thereto with a centrally located first axis and a second torsion tube affixed thereto with a centrally located second axis, said first and second axes being parallel, said first torsion tube having a first torsion bar held therein and resisting rotation with respect to said first torsion tube, said second torsion tube having a second torsion bar held therein and resisting rotation with respect to said second torsion tube;

a coupler side having a coupler channel portion having a coupler channel width and a plurality of apertures extending therethrough and aligned with a channel plane, said coupler channel portion adapted to receive and affix said adjustable coupler, said coupler side having a third torsion tube affixed thereto with a centrally located third axis, said coupler side having a fourth torsion tube affixed thereto with a centrally located fourth axis, said third and fourth axes being parallel, said third torsion tube having a third torsion bar held therein and resisting rotation with respect to said third torsion tube, said fourth torsion tube having a fourth torsion bar held therein and resisting rotation with respect to said fourth torsion tube;

a lower torsion arm affixed to a terminal end of said first torsion bar and affixed to a terminal end of said third torsion bar, an upper torsion arm affixed to a terminal end of said second torsion bar and affixed to a terminal end of said fourth torsion bar, said upper and lower torsion arms coupling said trailer side to said coupler side; and said upper and lower torsion arms rotatable between an unloaded position and a loaded position, said torsion arms being biased toward said unloaded position, said upper and lower torsion arms remaining parallel between said loaded and said unloaded position, said tongue plane remaining parallel to said channel plane.

2. The torsion trailer coupler of claim 1, further comprising a load indicator affixed to one of said torsion arms wherein said load indicator is disposed adjacent to one of said torsion tubes, said torsion tube adjacent said load indicator having a reference line, said load indicator moving with respect to said reference line when said trailer side moves with respect to said coupler side.

3. The torsion trailer coupler of claim 1, wherein said torsion tubes on said trailer side are obliquely angled with respect to said tongue plane, said torsion tubes on said coupler side are obliquely angled with respect to said channel plane.

4. The torsion trailer coupler of claim 1, wherein said tongue portion has a first and second parallel plate affixed to said first and second torsion tubes, said first and second parallel plates being identical.

5. The torsion trailer coupler of claim 1, wherein said coupler channel portion has a third and fourth parallel plate affixed to said third and fourth torsion tubes and a coupler channel, said third and fourth parallel plates being identical.

6. The torsion trailer coupler of claim 1, wherein said upper and lower torsion arms are obliquely angled with respect to said tongue plane and said channel plane when said torsion arms are in said unloaded position.

7. The torsion trailer coupler of claim 1, wherein said first and second axes are equally spaced from said tongue plane, said third and fourth axes equally spaced from said tongue plane.

8. A torsion trailer coupler adapted to be affixed between a trailer frame and an adjustable coupler, said trailer frame having a fixed channel affixed thereto, said torsion trailer coupler comprising:

a trailer side having a tongue portion adapted to be received by and affixed to said fixed channel, said tongue portion having a tongue plane, said trailer side having a first torsion tube affixed thereto with a centrally located first axis and a second torsion tube affixed thereto with a centrally located second axis, said first and second axes being parallel and equally spaced from said tongue plane, said first torsion tube having a first torsion bar held therein and resisting rotation with respect to said first torsion tube, said second torsion tube having a second torsion bar held therein and resisting rotation with respect to said second torsion tube;

a coupler side having a coupler channel portion having a channel plane, said coupler channel portion adapted to receive and affix said adjustable coupler, said coupler side having a third torsion tube affixed thereto with a centrally located third axis, said coupler side having a fourth torsion tube affixed thereto with a centrally located fourth axis, said third and fourth axes being parallel and equally spaced from said channel plane, said third torsion tube having a third torsion bar held therein and resisting rotation with respect to said third torsion tube, said fourth torsion tube having a fourth torsion bar held therein and resisting rotation with respect to said fourth torsion tube;

a lower torsion arm affixed to said first torsion bar and affixed to said third torsion bar, an upper torsion arm affixed to said second torsion bar and affixed to said fourth torsion bar, said upper and lower torsion arms coupling said trailer side to said coupler side; and said upper and lower torsion arms rotatable between an unloaded position and a loaded position, said torsion arms being biased toward said unloaded position, said upper and lower torsion arms remaining parallel between said loaded and said unloaded position, said tongue plane remaining parallel to said channel plane.

9. The torsion trailer coupler of claim 8, further comprising a load indicator affixed to one of said torsion arms wherein said load indicator is disposed adjacent to one of said torsion tubes, said torsion tube adjacent said load indicator having a reference line, said load indicator moving with respect to said reference line when said trailer side moves with respect to said coupler side.

10. The torsion trailer coupler of claim 8, wherein said torsion tubes on said trailer side are obliquely angled with respect to said tongue plane, said torsion tubes on said coupler side are obliquely angled with respect to said channel plane.

11. The torsion trailer coupler of claim 8, wherein each said torsion arms having a pocket adapted to receive a terminal end of said torsion bars, said terminal ends of said torsion bars located in said pockets of said torsion arms when said torsion arms are affixed to said torsion bars.

12. The torsion trailer coupler of claim 8, each said torsion arm having a corresponding torsion arm axis intersecting a corresponding centrally located axis of said corresponding torsion bar, each said torsion arm axis remaining parallel to another said torsion arm axis.

13. The torsion trailer coupler of claim 8, wherein said upper and lower torsion arms are obliquely angled with respect to said tongue plane and said channel plane when said torsion arms are in said unloaded position.

14. The torsion trailer coupler of claim 8, wherein said first and second axes are equally spaced from said tongue plane, said third and fourth axes equally spaced from said tongue plane.

15. A torsion trailer coupler adapted to be affixed between a trailer frame and an adjustable coupler, said trailer frame having a fixed channel affixed thereto, said torsion trailer coupler comprising:

a trailer side having a tongue portion adapted to be received by and affixed to said fixed channel, said tongue portion having a tongue plane, said trailer side having a first torsion tube affixed thereto with a centrally located first axis, said first torsion tube having a first torsion bar held therein and resisting rotation with respect to said first torsion tube;

a coupler side having a coupler channel portion having a channel plane, said coupler channel portion adapted to receive and affix said adjustable coupler, said coupler side having a third torsion tube affixed thereto with a centrally located third axis, said third torsion tube having a third torsion bar held therein and resisting rotation with respect to said third torsion tube;

a torsion arm affixed to said first torsion bar and affixed to said third torsion bar, said torsion arm coupling said trailer side to said coupler side; and said torsion arm rotatable between an unloaded position and a loaded position, said torsion arm being biased toward said unloaded position, said tongue plane remaining parallel to said channel plane.

16. The torsion trailer coupler of claim 1, said trailer side having a second torsion tube affixed thereto with a centrally located second axis, said second axis being parallel to said first axis, said coupler side having a fourth torsion tube affixed thereto with a centrally located fourth axis, said fourth axis bring parallel to said third axis, said second torsion tube having a second torsion bar held therein and resisting rotation with respect to said second torsion tube, said fourth torsion tube having a fourth torsion bar held therein and resisting rotation with respect to said fourth torsion tube.

17. The torsion trailer coupler of claim 16, further comprising a second torsion arm affixed to said second and said fourth torsion bars.

18. The torsion trailer coupler of claim 17, wherein said first and second axes are equally spaced from said tongue plane, said third and fourth axes equally spaced from said channel plane.

19. The torsion trailer coupler of claim 15, further comprising a load indicator affixed to one of said torsion arms wherein said load indicator is disposed adjacent to one of said torsion tubes, said torsion tube adjacent said load indicator having a reference line, said load indicator moving with respect to said reference line when said trailer side moves with respect to said coupler side.

20. The torsion trailer coupler of claim 15, wherein said torsion tube on said trailer side is obliquely angled with respect to said tongue plane, said torsion tube on said coupler side is obliquely angled with respect to said channel plane.

* * * * *